US011983363B1

(12) United States Patent
Pan et al.

(10) Patent No.: US 11,983,363 B1
(45) Date of Patent: May 14, 2024

(54) USER GESTURE BEHAVIOR SIMULATION SYSTEM AND USER GESTURE BEHAVIOR SIMULATION METHOD APPLIED THERETO

(71) Applicant: PRIMAX ELECTRONICS LTD., Taipei (TW)

(72) Inventors: Yung-Tai Pan, Taipei (TW); Jui-Hung Hsu, Taipei (TW); Chang-Ming Huang, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 18/460,718

(22) Filed: Sep. 5, 2023

Related U.S. Application Data

(60) Provisional application No. 63/483,982, filed on Feb. 9, 2023.

(51) Int. Cl.
G06F 3/041 (2006.01)
G06F 3/01 (2006.01)
G06F 3/042 (2006.01)
H04R 1/02 (2006.01)

(52) U.S. Cl.
CPC ............ G06F 3/0418 (2013.01); G06F 3/016 (2013.01); G06F 3/0414 (2013.01); G06F 3/0425 (2013.01); H04R 1/028 (2013.01); G06F 2203/04104 (2013.01)

(58) Field of Classification Search
CPC ......... G06F 2203/04104; G06F 3/0418; G06F 3/016; G06F 3/0414; G06F 3/0425; H04R 1/028

See application file for complete search history.

(56) References Cited

U.S. PATENT DOCUMENTS

| 10,705,619 | B2 * | 7/2020 | Johri ................... G06F 3/011 |
| 2010/0265170 | A1 * | 10/2010 | Norieda ............ G06F 3/04883 |
| | | | 345/156 |
| 2014/0152624 | A1 * | 6/2014 | Piot .................... G06F 3/0421 |
| | | | 345/175 |
| 2016/0306957 | A1 * | 10/2016 | Qu ...................... G06F 3/0488 |
| 2017/0336903 | A1 * | 11/2017 | Rivaud ................ B60K 35/00 |

(Continued)

FOREIGN PATENT DOCUMENTS

| CN | 106462296 A | * | 2/2017 | ......... G06F 3/03542 |
| CN | 111693263 A | * | 9/2020 | |

(Continued)

*Primary Examiner* — Ricardo Osorio
(74) *Attorney, Agent, or Firm* — WPAT, P.C (57) ABSTRACT

A user gesture behavior simulation system includes a touch gesture recording and editing device and a touch gesture simulation device. When at least one touch gesture is implemented on a record touch object with at least one finger of a user, the at least one touch gesture is recorded by the touch gesture recording and editing device, and at least one touch gesture operating trajectory is correspondingly generated by the touch gesture recording and editing device. The touch gesture simulation device includes at least one artificial finger. The at least one artificial finger is driven and moved to an under-test touch object by the touch gesture simulation device. The at least one touch gesture is simulated by the touch gesture simulation device according to the at least one touch gesture operating trajectory.

19 Claims, 8 Drawing Sheets

(56) References Cited

U.S. PATENT DOCUMENTS

2018/0188894 A1* 7/2018 Feinstein ................ G06F 3/041
2022/0053166 A1* 2/2022 Liu ....................... G06F 3/0482

FOREIGN PATENT DOCUMENTS

| CN | 114237427 A | * | 3/2022 | | |
|----|----|----|----|----|----|
| CN | 11009713 A | * | 4/2023 | | |
| EP | 3798590 A1 | * | 3/2021 | ............... | G01H 1/00 |
| EP | 3798599 A1 | * | 3/2021 | ............ | G01H 17/00 |
| TW | 201218036 A | * | 5/2012 | ............ | A61K 36/21 |
| WO | WO-2013135299 A1 | * | 9/2013 | ............ | G06F 3/017 |

* cited by examiner

USER GESTURE BEHAVIOR SIMULATION SYSTEM AND USER GESTURE BEHAVIOR SIMULATION METHOD APPLIED THERETO

CROSS-REFERENCE TO RELATED APPLICATION

This application claims priority to U.S. Provisional Patent Application No. U.S. 63/483,982 filed Feb. 9, 2023, the contents of which are incorporated herein by reference.

FIELD OF THE INVENTION

The present invention relates to a user gesture behavior simulation system and a user gesture behavior simulation method for the system, and more particularly to a user gesture behavior simulation system associated with touch gestures and a user gesture behavior simulation method for the system.

BACKGROUND OF THE INVENTION

Nowadays, in the production activities of various electronic products, the requirements for the production automation are increasing. For example, in the conventional manual product-testing task, it is necessary to continuously do research on the automated machine equipment to replace the human labor. Consequently, in the overall production process, the efficiency of inspections related to the production quality will be enhanced.

For example, the touch control functions of force pads, track pads, touch pads, touch screens and various touch-sensitive electronic products are manually tested in the production process. However, in case that the force is applied manually, it is difficult to achieve the stability and the consistency of the magnitude and the trajectory of the applied force. Consequently, the design of the testing fixture is very complicated. In addition, the efficiency of manual testing process is very low. That is, the manual testing process is inefficient.

Therefore, it is important to simulate various touch gestures of users (e.g., testers) with a machine equipment in order to manufacture and test the touch-sensitive electronic products.

SUMMARY OF THE INVENTION

In order to overcome the drawbacks of the conventional technologies, the present invention provides a user gesture behavior simulation system and a user gesture behavior simulation method for the system by using a machine equipment to simulate various touch gestures of a user (e.g., a tester) and performing an automatic production testing process on a touch-sensitive electronic product.

In accordance with an aspect of the present invention, a user gesture behavior simulation system is provided. The user gesture behavior simulation system includes a touch gesture recording and editing device and a touch gesture simulation device. When at least one touch gesture is implemented on a record touch object with at least one finger of a user, the at least one touch gesture is recorded by the touch gesture recording and editing device, and at least one touch gesture operating trajectory is correspondingly generated by the touch gesture recording and editing device. The touch gesture simulation device includes at least one artificial finger. The at least one artificial finger is driven and moved to an under-test touch object by the touch gesture simulation device. The at least one touch gesture is simulated by the touch gesture simulation device according to the at least one touch gesture operating trajectory.

In an embodiment, the touch gesture recording and editing device at least includes a touch gesture recorder, a database and the record touch object. The database is electrically connected with the touch gesture recorder.

In an embodiment, the touch gesture recorder is microprocessor controller or a computing device, or the database is a remote database or a local database.

In an embodiment, the touch gesture recording and editing device further includes a microphone. When the at least one touch gesture is implemented on the record touch object, a haptic force vibration and click feedback is generated, a touch echo information corresponding to the haptic force vibration and click feedback is recorded by the microphone.

In an embodiment, each of the record touch object and the under-test touch object is a force pad, a track pad, a touch pad and a touch screen.

In an embodiment, the at least one touch gesture includes one or plural touch gestures. The at least one touch gesture is implemented when a single finger of the at least one finger of the user is moved on the record touch object along different directions or pressed on the record touch object. Alternatively, the at least one touch gesture is implemented when plural fingers of the at least one finger of the user are placed together and/or spread apart and moved on the record touch object along different direction or pressed on the record touch object.

In an embodiment, each of the at least one touch gesture operating trajectory is a movement tracking path including a touch starting point and a touch ending point.

In an embodiment, the movement tracking path contains at least one of a touch gesture position and moving direction change information, a touch gesture moving speed information, a record sampling frequency information, a touch force change information, a haptic force vibration feedback strength change information and a touch echo information.

In an embodiment, the touch gesture simulation device at least includes an X-axis horizontal movement mechanism, a first Y-axis vertical movement mechanism and a Z-axis up/down movement mechanism to comprehensively simulate a motion mode of an arm and an elbow of the user.

In an embodiment, the touch gesture simulation device further includes a second Y-axis vertical movement mechanism. The second Y-axis vertical movement mechanism works cooperatively with the X-axis horizontal movement mechanism, the first Y-axis vertical movement mechanism and the Z-axis up/down movement mechanism.

In an embodiment, the touch gesture simulation device further includes a rotating mechanism, and a palm twist motion mode of the user is simulated by the rotating mechanism.

In an embodiment, the at least one finger of the user includes five fingers, and the touch gesture simulation device further includes five artificial fingers that simulate the five fingers, respectively.

In an embodiment, the five artificial fingers are operable in a horizontal movement mode. In the horizontal movement mode, the five artificial fingers are movable in a direction toward each other or in a direction away from each other. Consequently, a motion mode of placing together or spreading apart the five fingers of the user are simulated.

In an embodiment, each of the five artificial fingers is operable in an up/down motion mode. In the up/down motion mode, a motion mode of generating an up/down haptic force vibration and click feedback of each of the five fingers of the user is simulated.

In an embodiment, the touch gesture simulation device further includes at least one image capturing device, and a positioning condition of the at least one artificial finger and/or the under-test touch object is monitored by the at least one image capturing device.

In accordance with another aspect of the present invention, a user gesture behavior simulation method for a user gesture behavior simulation system is provided. The user gesture behavior simulation system includes a touch gesture recording and editing device and a touch gesture simulation device. The user gesture behavior simulation method includes the following steps. Firstly, at least one touch gesture that is implemented on a record touch object of the touch gesture recording and editing device is recorded, and at least one touch gesture operating trajectory is generated according to the at least one touch gesture. Then, at least one artificial finger of the touch gesture simulation device is driven and moved to an under-test touch object, and the at least one touch gesture is simulated according to the at least one touch gesture operating trajectory.

In an embodiment, each of the record touch object and the under-test touch object is a force pad, a track pad, a touch pad and a touch screen.

In an embodiment, the at least one touch gesture includes one or plural touch gestures. The at least one touch gesture is implemented when a single finger of the at least one finger of the user is moved on the record touch object along different directions or pressed on the record touch object. Alternatively, the at least one touch gesture is implemented when plural fingers of the at least one finger of the user are placed together and/or spread apart and moved on the record touch object along different direction or pressed on the record touch object.

In an embodiment, each of the at least one touch gesture operating trajectory is a movement tracking path including a touch starting point and a touch ending point.

In an embodiment, the movement tracking path contains at least one of a touch gesture position and moving direction change information, a touch gesture moving speed information, a record sampling frequency information, a touch force change information, a haptic force vibration feedback strength change information and a touch echo information.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. In the following embodiments and drawings, the elements irrelevant to the concepts of the present invention are omitted and not shown.

Figure 1:
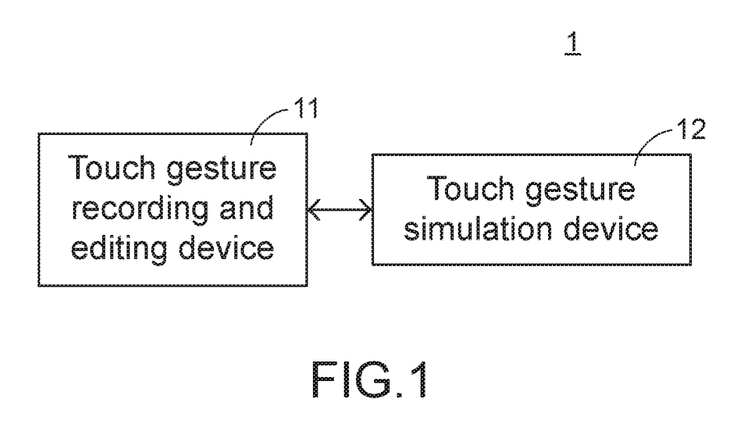
FIG. 1 is a schematic functional block diagram illustrating a user gesture behavior simulation system according to an embodiment of the present invention.

FIG. 1 is a schematic functional block diagram illustrating a user gesture behavior simulation system according to an embodiment of the present invention. As shown in FIG. 1, the user gesture behavior simulation system 1 at least comprises a touch gesture recording and editing device 11 and a touch gesture simulation device 12.

An implementation process of the user gesture behavior simulation system will be described as follows. Firstly, the touch gesture recording and editing device 11 is used to record and edit a batch of touch gestures of the user. Then, the touch gesture simulation device 12 performs a real user touch gesture simulation according to the recording and editing result of the touch gesture recording and editing device 11. Optionally, while the touch gesture simulation device 12 performs the real user touch gesture simulation, a different touch gesture (i.e., a new touch gesture) is also recorded and edited by the touch gesture recording and editing device 11. Then, the touch gesture simulation device 12 performs the real user touch gesture simulation according to the new recording and editing result of the touch gesture recording and editing device 11. The operations of the touch gesture recording and editing device 11 and the touch gesture simulation device 12 are not restricted.

Figure 2:
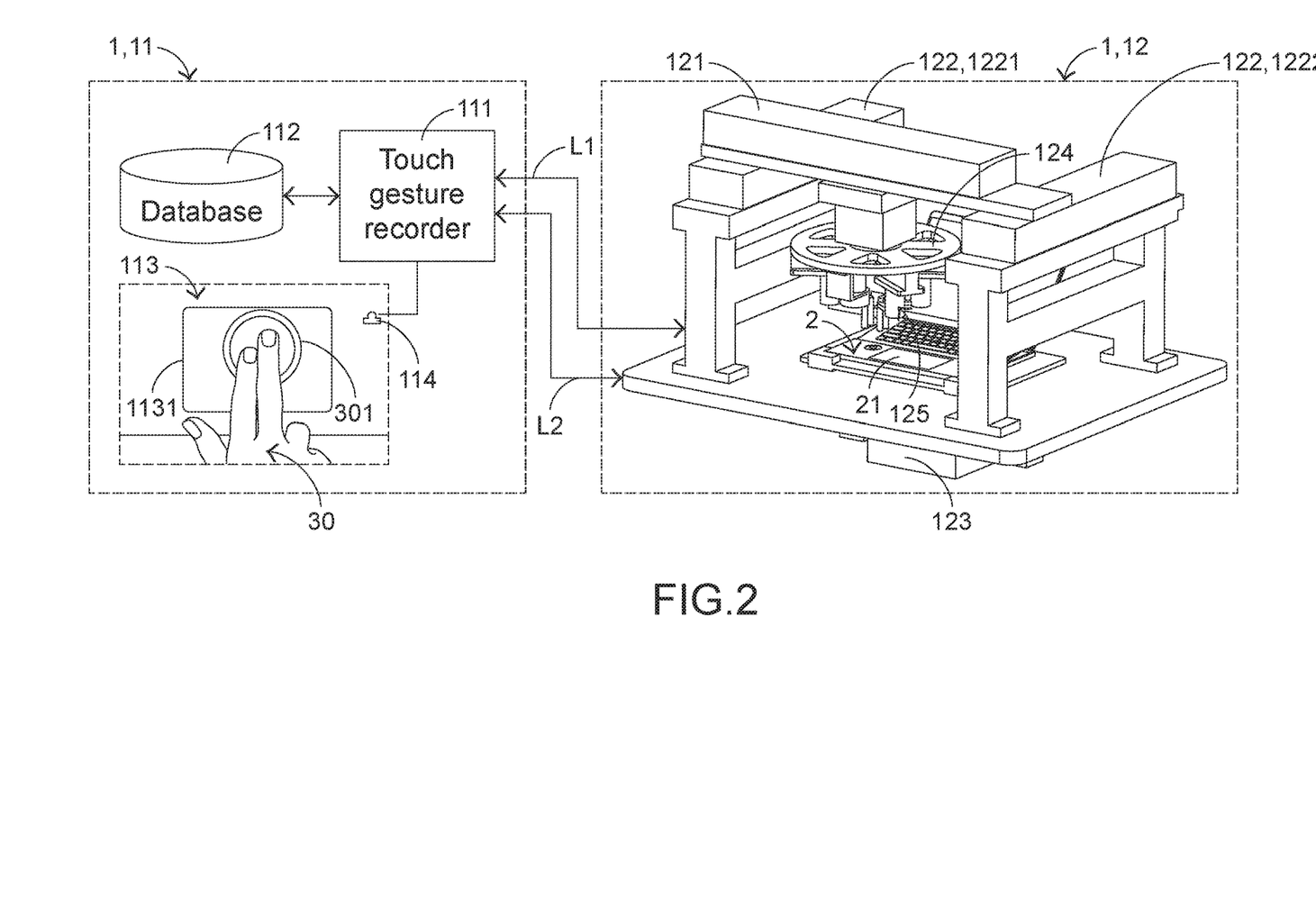
FIG. 2 schematically illustrates the architecture of the user gesture behavior simulation system 1 shown in FIG. 1.

FIG. 2 schematically illustrates the architecture of the user gesture behavior simulation system 1 shown in FIG. 1. The user gesture behavior simulation system 1 of FIG. 1 and the implementation method of FIG. 2 are applied to a device under test (DUT). In this context, the device under test is also referred to as an under-test touch object. For example, the under-test touch object is a touch-sensitive electronic product. For example, the touch-sensitive electronic product is a notebook computer with a force pad. For well understanding the concepts of the present invention, the touch-sensitive electronic product to be subjected to the real user touch gesture simulation is a notebook computer with a force pad, and another force pad is used as the touch object for recording touch gestures. In this context, the touch object for recording touch gestures is referred as a record touch object.

The record touch object and the under-test touch object are not restricted to force pads. Preferably but not exclusively, each of the record touch object and the under-test touch object is a force pad, a track pad, a touch pad and a touch screen.

Please refer to FIGS. 1 and 2 again. At least one touch gesture 30 implemented on a record touch object 113 with at least one finger of a user is recorded by the touch gesture recording and editing device 11. Moreover, according to the at least one touch gesture 30, at least one touch gesture operating trajectory 301 is generated. The touch gesture simulation device 12 comprises at least one artificial finger 125. The at least one artificial finger 125 is driven and moved to a touch operating region 21 of an under-test touch object 2. According to the at least one touch gesture operating trajectory 301, the touch gesture simulation device 12 simulates the at least one touch gesture 30.

In an embodiment, the touch gesture recording and editing device 11 at least comprises a touch gesture recorder 111, a database 112 and the record touch object 113. The database 112 is electrically connected with the touch gesture recorder 111. For example, the record touch object 113 is a force pad. The touch gesture recorder 111 is microprocessor controller or a computing device. The database 112 is a remote database or a local database. The touch gesture recording and editing device 11 further comprises a microphone 114. When the at least one touch gesture 30 is implemented on a touch operating region 1131 of the record touch object 113, a touch echo information is generated. The touch echo information is collected and recorded by the microphone 114.

The record touch object 113 is electrically connected with the touch gesture recorder 111 through some interfaces (e.g., USB interfaces). In addition, the touch gesture recorder 111 is connected with the remote and/or local database 112. The touch gesture operating trajectory 301 corresponding to the touch gesture 30 comprises a movement tracking path, which includes a touch starting point and a touch ending point. The touch gesture operating trajectory 301 is recorded into the database 112 through the touch gesture recorder 111.

Preferably but not exclusively, the at least one touch gesture operating trajectory 301 (i.e., the movement tracking path) contains at least one of a touch gesture position and moving direction change information (e.g., X/Y/Z axis position information and associated change information), a touch gesture moving speed information, a record sampling frequency information, a touch force change information, a haptic force vibration feedback strength change information and a touch echo information.

As shown in FIG. 2, the at least one touch gesture 30 is implemented when a single finger is moved or pressed, or the at least one touch gesture 30 is implemented when plural fingers of at least one finger (e.g., five fingers) of the user are placed together and/or spread apart. Consequently, a single touch gesture or various touch gestures corresponding to the actions of moving the fingers along different directions or the pressing actions can be implemented on a touch operating region 1131 of the record touch object 113.

Figure 3:
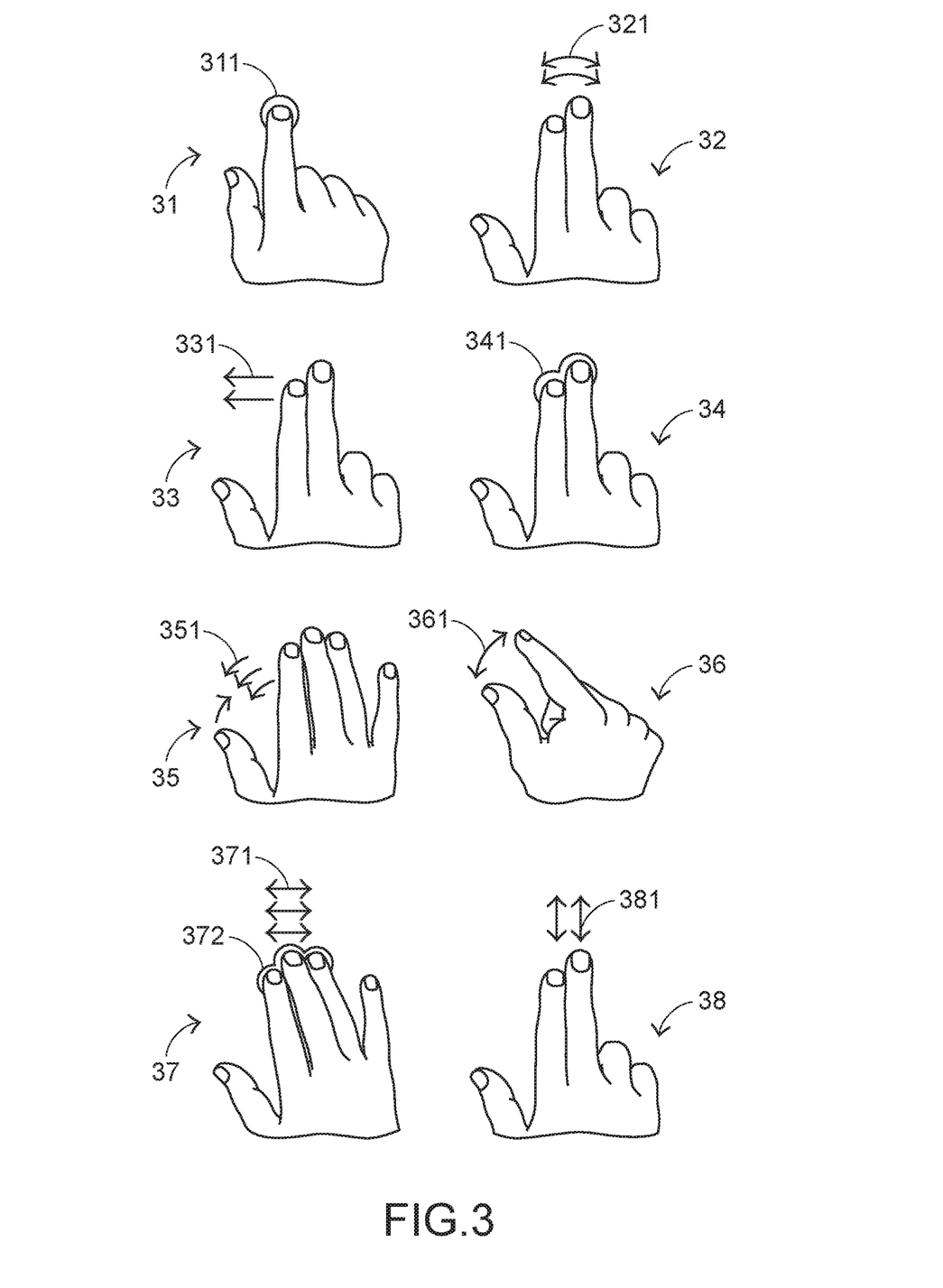
FIG. 3 schematically illustrates various touch gestures to be recorded in the touch gesture recording and editing device shown in FIG. 2.

FIG. 3 schematically illustrates various touch gestures to be recorded in the touch gesture recording and editing device shown in FIG. 2. In FIG. 3, eight touch gestures 31~38 are shown. When the touch gesture 31 is implemented on the touch operating region 1131 of the record touch object 113, a touch gesture operating trajectory 311 is generated in response to the corresponding touch pressing operation. When the touch gesture 32 is implemented on the touch operating region 1131 of the record touch object 113, a touch gesture operating trajectory 321 is generated in response to the corresponding moving direction. When the touch gesture 33 is implemented on the touch operating region 1131 of the record touch object 113, a touch gesture operating trajectory 331 is generated in response to the corresponding moving direction. When the touch gesture 34 is implemented on the touch operating region 1131 of the record touch object 113, a touch gesture operating trajectory 341 is generated in response to the corresponding touch pressing operation. When the touch gesture 35 is implemented on the touch operating region 1131 of the record touch object 113, a touch gesture operating trajectory 351 is generated in response to the corresponding moving direction. When the touch gesture 36 is implemented on the touch operating region 1131 of the record touch object 113, a touch gesture operating trajectory 361 is generated in response to the corresponding moving direction. When the touch gesture 37 is implemented on the touch operating region 1131 of the record touch object 113, a touch gesture operating trajectory 371 is generated in response to the corresponding moving direction and a touch gesture operating trajectory 372 is generated in response to the corresponding touch pressing operation. When the touch gesture 38 is implemented on the touch operating region 1131 of the record touch object 113, a touch gesture operating trajectory 381 is generated in response to the corresponding moving direction. These touch gesture operating trajectories are recorded into the database 112 through the touch gesture recorder 111.

After the above procedures are completed, the at least one touch gesture to be provided to the touch gesture simulation device 12 for simulation has been recorded in the touch gesture recording and editing device 11. Then, the touch gesture simulation device 12 shown in FIG. 2 cooperates with the touch gesture recorder 111 and the database 112 through a built-in or external control box (not shown) and via some transmission interfaces L1 and L2. For example, the transmission interfaces L1 and L2 are Ethernet interfaces or USB/UART (RS232) interfaces. Consequently, various human touch operating behaviors can be simulated on the touch operating region 21 of the under-test touch object 2 autonomously.

In an embodiment, the touch gesture simulation device 12 at least comprises an X-axis horizontal movement mechanism 121, a Y-axis vertical movement mechanism 122 (1221) and a Z-axis up/down movement mechanism 123 in order to comprehensively simulate the motion mode of an arm and an elbow of the user. Preferably, the touch gesture simulation device 12 further comprises another Y-axis vertical movement mechanism 1222. The Y-axis vertical movement mechanism 1222 works cooperatively with the X-axis horizontal movement mechanism 121, the Y-axis vertical movement mechanism 1221 and the Z-axis up/down movement mechanism 123.

In an embodiment, the touch gesture simulation device 12 further comprises a rotating mechanism 124. For example, the rotating mechanism 124 is a rotary disc. The rotating mechanism 124 is used to simulate a palm twist motion mode of the user.

In an embodiment, the touch gesture simulation device 12 further comprises five artificial fingers 125 (1251~1255) for respectively simulating five fingers of the user. The five artificial fingers 1251~1255 can be operated in a horizontal movement mode. In the horizontal movement mode, the five artificial fingers 1251~1255 can be moved in the direction toward each other or in the direction away from each other. Consequently, the motion mode of placing together or spreading apart the five fingers of the user can be simulated. Furthermore, the five artificial fingers 1251~1255 can be operated in the up/down motion mode. In the up/down motion mode, the motion mode of generating the up/down haptic force vibration and click feedback of the five fingers of the user can be simulated.

In an embodiment, the five artificial fingers 1251~1255 are in a radial arrangement. Each artificial finger can be slid forwardly or backwardly along a single direction. Furthermore, each artificial finger can be moved along the Z-axis direction to be contacted with the touch operating region 21 of an under-test touch object 2.

In another embodiment, four of the five artificial fingers 1251~1255 are divided into two pairs, and the two artificial fingers in each pair face each other. Consequently, the two artificial fingers in each pair can be moved in the direction toward each other or in the direction away from each other. In other words, the artificial fingers can be subjected to the open/close movement.

Furthermore, the axis-direction movement about the haptic force vibration and click feedback is an axis-direction movement when each of the five artificial fingers 1251~1255 is subjected to a simulation touch operation on the touch operating region 21 of the under-test touch object 2 to generate the corresponding haptic force vibration and click feedback.

The number of the artificial fingers 125 and the implementation examples of the artificial fingers 125 may be varied according to the practical requirements. In other words, the applications of the present invention are not restricted to the five artificial fingers 1251~1255.

Figure 4A:
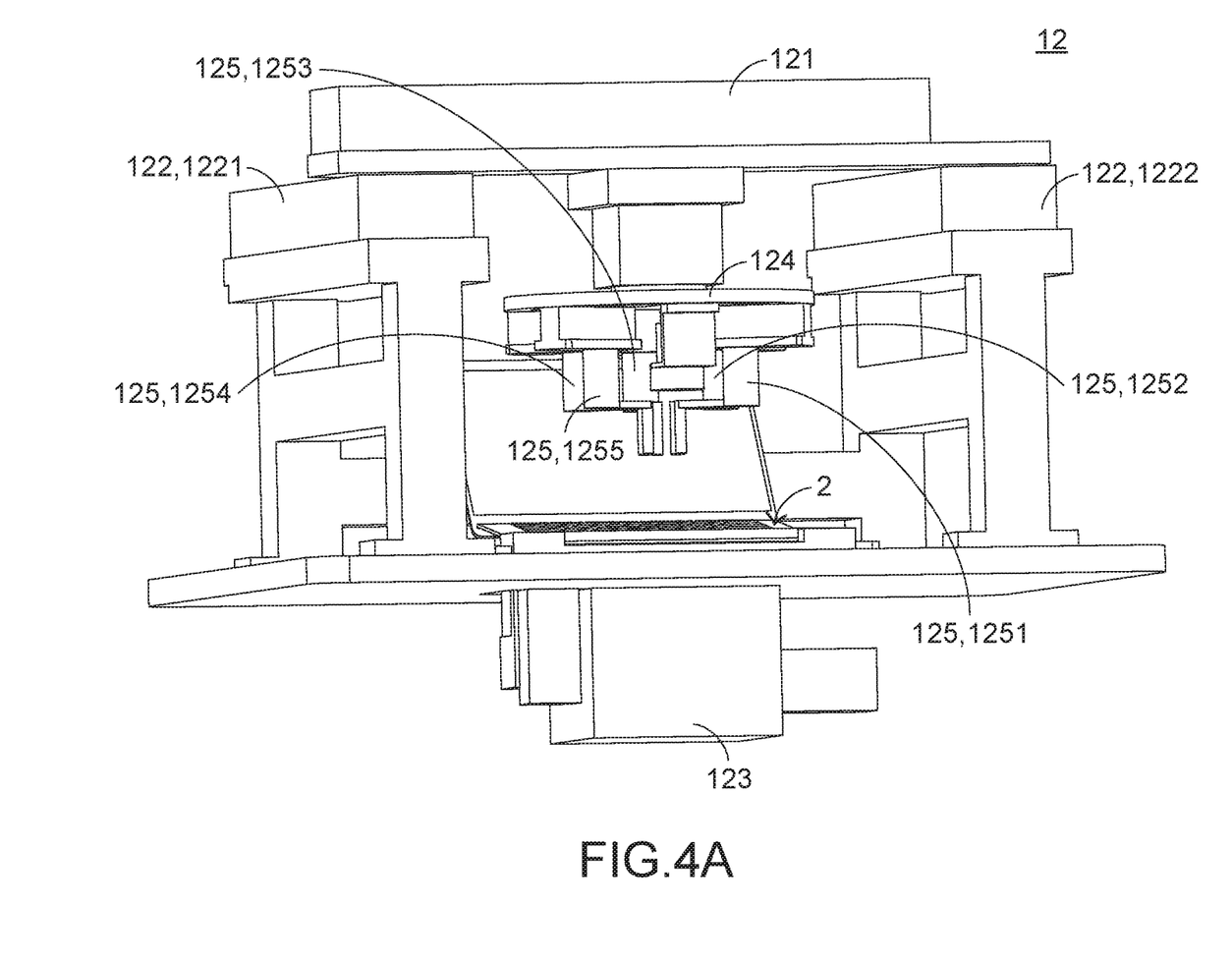
FIGS. 4A, 4B and 4C are schematic perspective views illustrating the touch gesture simulation device shown in FIG. 2 and taken along different viewpoints.
Figure 4B:
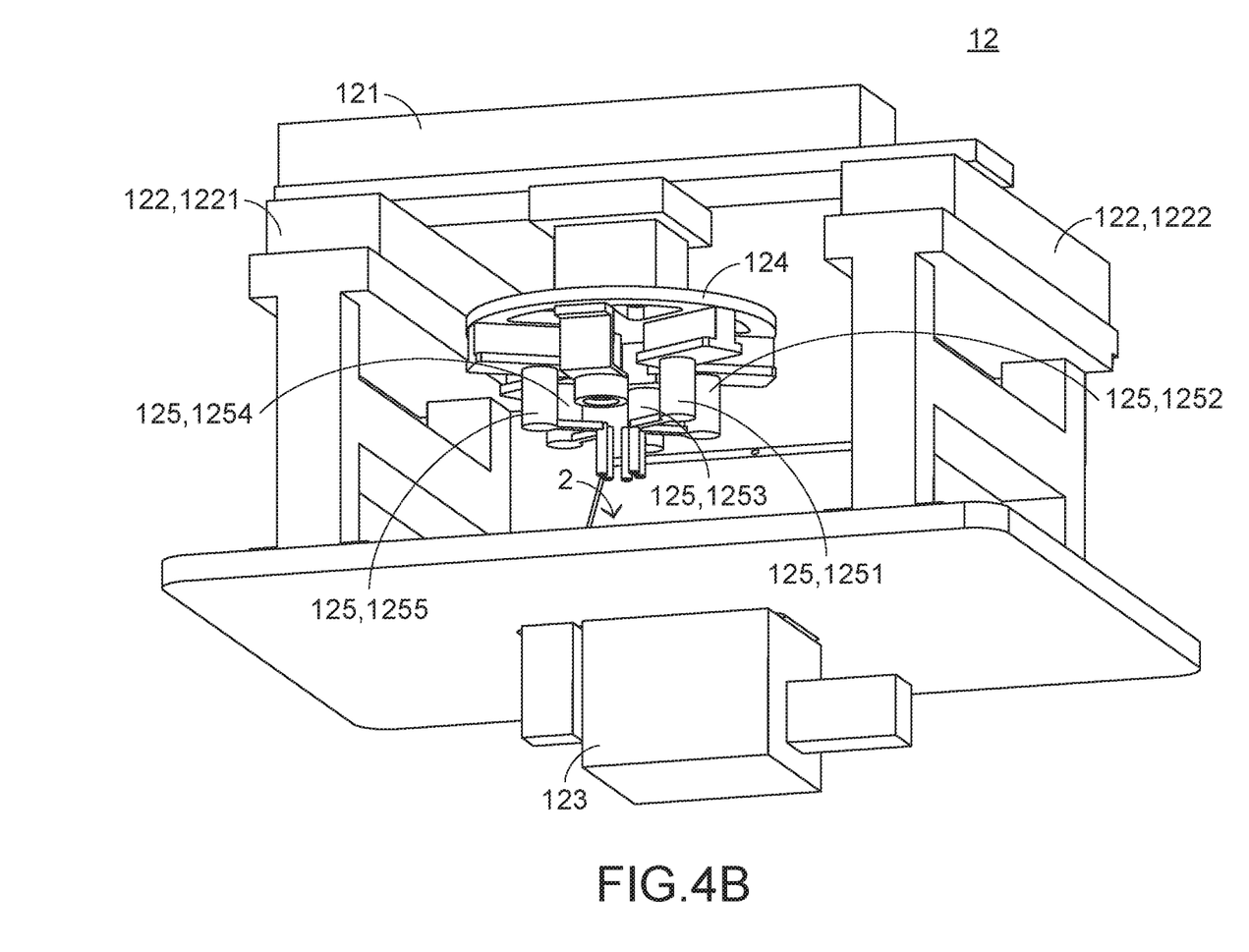
Figure 4C:
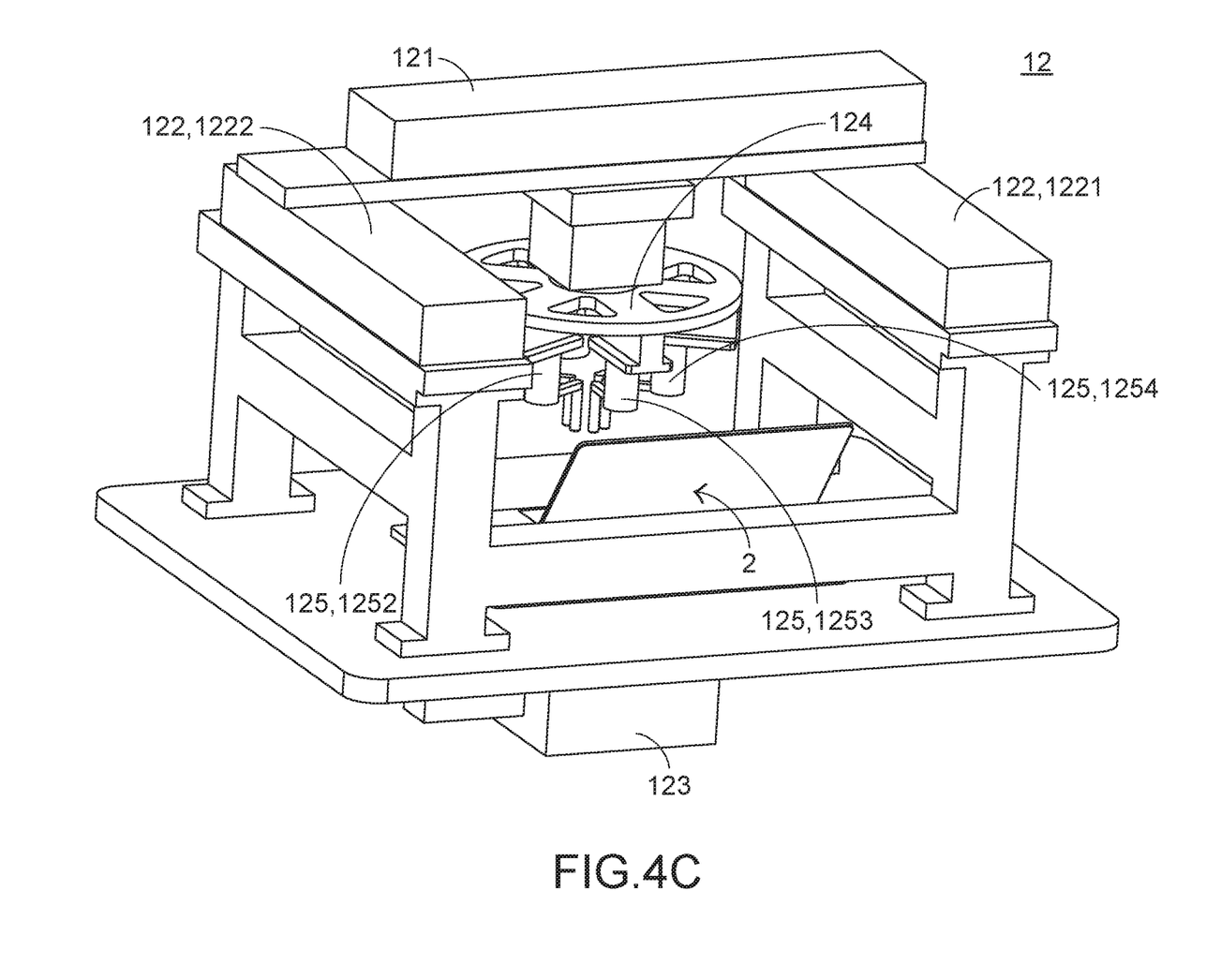

FIGS. 4A, 4B and 4C are schematic perspective views illustrating the touch gesture simulation device shown in FIG. 2 and taken along different viewpoints. In FIGS. 4A, 4B and 4C, the relationships between the five artificial fingers 1251~1255 and other components of the touch gesture simulation device 12 will be described.

Furthermore, the touch gesture simulation device 12 works cooperatively with other hardware components. For example, the X-axis horizontal movement mechanism 121, the Y-axis vertical movement mechanism 122 (1221, 1222), the Z-axis up/down movement mechanism 123, the rotating mechanism 124 and the five artificial fingers 125 (1251~1255) are collaboratively formed as a 15-axis operating mechanism. Each of these mechanisms is equipped with a built-in motor controller and/or a built-in driving motor and controlling device (not shown). Alternatively, each of these mechanisms works cooperatively with an external built-in motor controller and/or an external built-in driving motor and controlling device. Consequently, various touch gestures can be simulated.

The 15-axis operating mechanism of the touch gesture simulation device 12 are presented herein for purpose of illustration and description only. The number of the axis directions and the implementation example of the operating mechanism may be varied according to the practical requirements.

In an embodiment, a metal block (not shown) is additionally placed on the touch operating region 21 of the under-test touch object 2 to simulate the large area contact between the palm and the touch operating region 21. The actual placement position of the metal block can be arbitrarily determined according to the testing requirements. That is, the placement position of the metal block is not restricted.

In an embodiment, the touch gesture simulation device 12 is additionally equipped with some safety sensors or some DUT in-place sensors. The safety sensors and the DUT in-place sensors are used for sensing the artificial fingers 125 (1251~1255) and preventing the artificial fingers 125 (1251~1255) from colliding with the under-test touch object 2 or preventing from the safety problem of collision when the under-test touch object 2 is placed into the touch gesture simulation device 12.

Furthermore, each of the five artificial fingers 125 (1251~1255) and the rotary disc 124 is additionally equipped with a vibration sensor or an accelerometer (not shown). When the touch operating region 21 of the under-test touch object 2 is sensed and pressed by the vibration sensor or the accelerometer, the vibration simulation touch feel is automatically fed back.

During the overall simulation process of the touch gesture simulation device 12, the power sequence and safety control mechanism for all components can be implemented with programmable logic controller (PLC controller).

Figure 5:
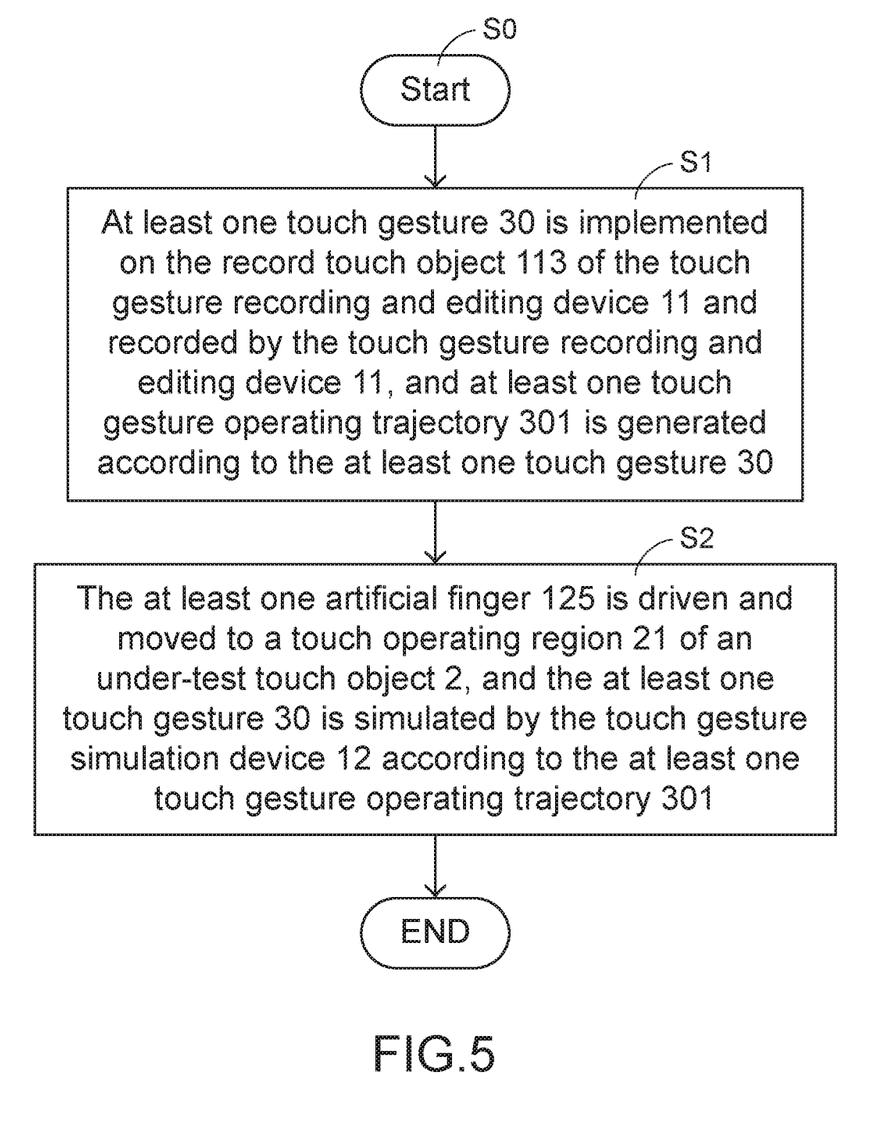
FIG. 5 is a flowchart illustrating a user gesture behavior simulation method according to an embodiment of the present invention.

The present invention also provides a user gesture behavior simulation method. The user gesture behavior simulation method is applied to a user gesture behavior simulation system shown in FIGS. 1 and 2. The user gesture behavior simulation system 1 comprises the touch gesture recording and editing device 11 and the touch gesture simulation device 12. FIG. 5 is a flowchart illustrating a user gesture behavior simulation method according to an embodiment of the present invention. The user gesture behavior simulation method comprises the following steps.

In a step S0, the flowchart is started.

In a step S1, at least one touch gesture 30 is implemented on the record touch object 113 of the touch gesture recording and editing device 11 and recorded by the touch gesture recording and editing device 11, and at least one touch gesture operating trajectory 301 is generated according to the at least one touch gesture 30.

In a step S2, the at least one artificial finger 125 is driven and moved to a touch operating region 21 of an under-test touch object 2, and the at least one touch gesture 30 is simulated by the touch gesture simulation device 12 according to the at least one touch gesture operating trajectory 301.

Figure 6:
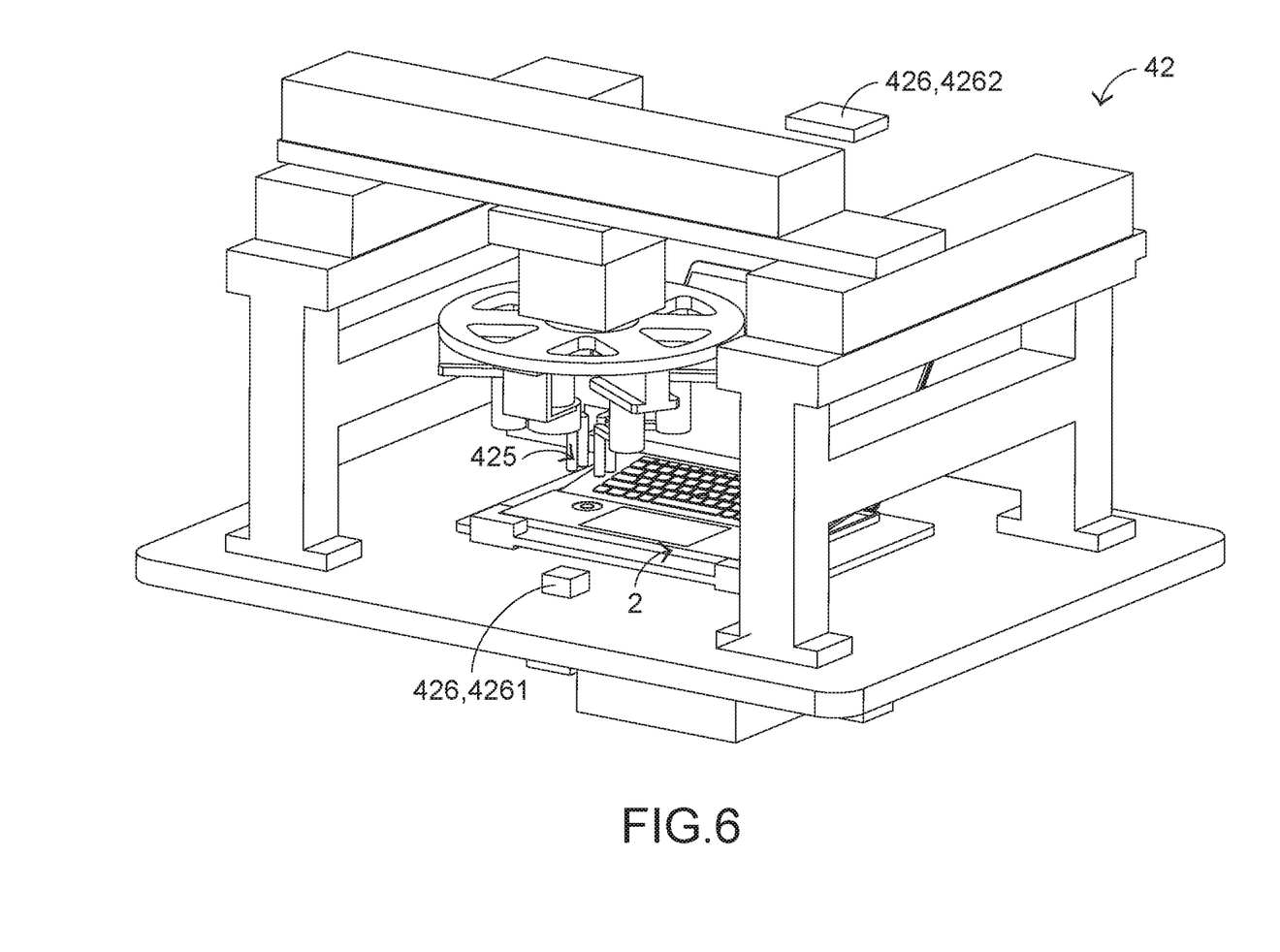
FIG. 6 is a schematic perspective view illustrating another example of the touch gesture simulation device in the user gesture behavior simulation system according to the embodiment of the present invention.

FIG. 6 is a schematic perspective view illustrating another example of the touch gesture simulation device in the user gesture behavior simulation system according to the embodiment of the present invention. In comparison with the following aspects, the components of the touch gesture simulation device 42 of this embodiment are similar to those of the touch gesture simulation device 12 shown in FIG. 2.

In comparison with the touch gesture simulation device 12, the touch gesture simulation device 42 of this embodiment further comprises at least one image capturing device 426. For example, the touch gesture simulation device 42 comprises two image capturing devices 4261 and 4262. The at least one image capturing device 426 is used for monitoring the positioning condition of the at least one artificial finger 425 of the touch gesture simulation device 42 and/or the under-test touch object 2. Consequently, the accuracy of the overall touch simulation operation can be assured.

From the above descriptions, the present invention provides a machine equipment for simulating various touch gestures of a user (e.g., a tester). According to the touch gestures, the touch-sensitive electronic products can be automatically tested in the production process. When compared with the manual testing process, the cost of the user gesture behavior simulation method of the present invention is effectively reduced, the detecting stability is largely increased, and the testing quality is assured. In other words, the technologies of the present invention are industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A user gesture behavior simulation system, comprising: a touch gesture recording and editing device, wherein when at least one touch gesture is implemented on a record touch object with at least one finger of a user, the at least one touch gesture is recorded by the touch gesture recording and editing device, and at least one touch gesture operating trajectory is correspondingly generated by the touch gesture recording and editing device; and a touch gesture simulation device comprising at least one artificial finger, wherein the at least one artificial finger is driven and moved to an under-test touch object by the touch gesture simulation device, and the at least one touch gesture is simulated by the touch gesture simulation device according to the at least one touch gesture operating trajectory, wherein the at least one finger of the user includes five fingers, and the touch gesture simulation device further comprises five artificial fingers that simulate the five fingers, respectively.

2. The user gesture behavior simulation system according to claim 1, wherein the touch gesture recording and editing device at least comprises a touch gesture recorder, a database and the record touch object, wherein the database is electrically connected with the touch gesture recorder.

3. The user gesture behavior simulation system according to claim 2, wherein the touch gesture recorder is microprocessor controller or a computing device, or the database is a remote database or a local database.

4. The user gesture behavior simulation system according to claim 2, wherein the touch gesture recording and editing device further comprises a microphone, wherein when the at least one touch gesture is implemented on the record touch object, a haptic force vibration and click feedback is generated, a touch echo information corresponding to the haptic force vibration and click feedback is recorded by the microphone.

5. The user gesture behavior simulation system according to claim 1, wherein each of the record touch object and the under-test touch object is a force pad, a track pad, a touch pad and a touch screen.

6. The user gesture behavior simulation system according to claim 1, wherein the at least one touch gesture includes one or plural touch gestures, wherein the at least one touch gesture is implemented when a single finger of the at least one finger of the user is moved on the record touch object along different directions or pressed on the record touch object, or the at least one touch gesture is implemented when plural fingers of the at least one finger of the user are placed together and/or spread apart and moved on the record touch object along different direction or pressed on the record touch object.

7. The user gesture behavior simulation system according to claim 1, wherein each of the at least one touch gesture operating trajectory is a movement tracking path including a touch starting point and a touch ending point.

8. The user gesture behavior simulation system according to claim 7, wherein the movement tracking path contains at least one of a touch gesture position and moving direction change information, a touch gesture moving speed information, a record sampling frequency information, a touch force change information, a haptic force vibration feedback strength change information and a touch echo information.

9. The user gesture behavior simulation system according to claim 1, wherein the touch gesture simulation device at least comprises an X-axis horizontal movement mechanism, a first Y-axis vertical movement mechanism and a Z-axis up/down movement mechanism to comprehensively simulate a motion mode of an arm and an elbow of the user.

10. The user gesture behavior simulation system according to claim 9, wherein the touch gesture simulation device further comprises a second Y-axis vertical movement mechanism, wherein the second Y-axis vertical movement mechanism works cooperatively with the X-axis horizontal movement mechanism, the first Y-axis vertical movement mechanism and the Z-axis up/down movement mechanism.

11. The user gesture behavior simulation system according to claim 1, wherein the touch gesture simulation device further comprises a rotating mechanism, and a palm twist motion mode of the user is simulated by the rotating mechanism.

12. The user gesture behavior simulation system according to claim 1, wherein the five artificial fingers are operable in a horizontal movement mode, wherein in the horizontal movement mode, the five artificial fingers are movable in a direction toward each other or in a direction away from each other, so that a motion mode of placing together or spreading apart the five fingers of the user are simulated.

13. The user gesture behavior simulation system according to claim 1, wherein each of the five artificial fingers is operable in an up/down motion mode, wherein in the up/down motion mode, a motion mode of generating an up/down haptic force vibration and click feedback of each of the five fingers of the user is simulated.

14. The user gesture behavior simulation system according to claim 1, wherein the touch gesture simulation device further comprises at least one image capturing device, and a positioning condition of the at least one artificial finger and/or the under-test touch object is monitored by the at least one image capturing device.

15. A user gesture behavior simulation method fora user gesture behavior simulation system, the user gesture behavior simulation system comprising a touch gesture recording and editing device and a touch gesture simulation device, the user gesture behavior simulation method comprising steps of: recording at least one touch gesture that is implemented on a record touch object of the touch gesture recording and editing device, and generating at least one touch gesture operating trajectory according to the at least one touch gesture; and driving at least one artificial finger of the touch gesture simulation device, moving the at least one artificial finger to an under-test touch object, and simulating the at least one touch gesture according to the at least one touch gesture operating trajectory, wherein the at least one finger of the user includes five fingers, and the touch gesture simulation device further comprises five artificial fingers that simulate the five fingers, respectively.

16. The user gesture behavior simulation method according to claim 15, wherein each of the record touch object and the under-test touch object is a force pad, a track pad, a touch pad and a touch screen.

17. The user gesture behavior simulation method according to claim 15, wherein the at least one touch gesture includes one or plural touch gestures, wherein the at least one touch gesture is implemented when a single finger of the at least one finger of the user is moved on the record touch object along different directions or pressed on the record touch object, or the at least one touch gesture is implemented when plural fingers of the at least one finger of the user are placed together and/or spread apart and moved on the record touch object along different direction or pressed on the record touch object.

18. The user gesture behavior simulation method according to claim 15, wherein each of the at least one touch gesture operating trajectory is a movement tracking path including a touch starting point and a touch ending point.

19. The user gesture behavior simulation method according to claim 18, wherein the movement tracking path contains at least one of a touch gesture position and moving direction change information, a touch gesture moving speed information, a record sampling frequency information, a touch force change information, a haptic force vibration feedback strength change information and a touch echo information.

* * * * *